US012519826B2

(12) United States Patent
Kurupati (10) Patent No.: US 12,519,826 B2
(45) Date of Patent: *Jan. 6, 2026

(54) AUTOMATED LEARNING AND DETECTION OF WEB BOT TRANSACTIONS USING DEEP LEARNING

(71) Applicant: Akamai Technologies, Inc., Cambridge, MA (US)

(72) Inventor: Sreenath Kurupati, Santa Clara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,604

(22) Filed: Jan. 9, 2024

(65) Prior Publication Data

US 2024/0154998 A1 May 9, 2024

Related U.S. Application Data

(63) Continuation of application No. 16/529,408, filed on Aug. 1, 2019, now Pat. No. 11,870,804.

(51) Int. Cl.
*H04L 9/40* (2022.01)
*G06N 3/08* (2023.01)

(52) U.S. Cl.
CPC ........... *H04L 63/1458* (2013.01); *G06N 3/08* (2013.01); *H04L 63/1466* (2013.01)

(58) Field of Classification Search
CPC .... H04L 63/1458; H04L 63/1466; G06N 3/08
See application file for complete search history.

(56) References Cited

U.S. PATENT DOCUMENTS

| | | | | |
|---|---|---|---|---|
| 7,849,032 | B1 * | 12/2010 | Campos | G06N 3/08 |
| | | | | 706/15 |
| 10,587,629 | B1 * | 3/2020 | Kurupati | H04L 63/1408 |
| 10,601,862 | B1 * | 3/2020 | Kurupati | G06N 20/00 |
| 10,708,281 | B1 * | 7/2020 | Modalavalasa | H04N 21/2408 |
| 10,776,476 | B2 * | 9/2020 | Turgeman | G06F 21/316 |
| 10,922,631 | B1 * | 2/2021 | Shahidzadeh | H04W 4/029 |
| 10,931,686 | B1 * | 2/2021 | Mehta | H04L 63/1416 |
| 11,005,839 | B1 * | 5/2021 | Shahidzadeh | H04W 12/06 |
| 11,096,059 | B1 * | 8/2021 | Shahidzadeh | G06Q 50/10 |
| 11,184,390 | B2 * | 11/2021 | Senecal | H04L 63/166 |
| 2017/0353477 | A1 * | 12/2017 | Faigon | G06F 21/554 |
| 2019/0245876 | A1 * | 8/2019 | Faigon | H04L 63/1416 |
| 2019/0253453 | A1 * | 8/2019 | Vissamsetty | H04L 63/10 |
| 2019/0297096 | A1 * | 9/2019 | Ahmed | H04L 63/1441 |
| 2019/0379699 | A1 * | 12/2019 | Katragadda | H04L 63/1425 |
| 2020/0045063 | A1 * | 2/2020 | Zhang | H04L 63/1416 |
| 2020/0050758 | A1 * | 2/2020 | Fullinwider | H04L 67/025 |
| 2020/0097653 | A1 * | 3/2020 | Mehta | G06N 3/045 |
| 2020/0112578 | A1 * | 4/2020 | Gupta | H04L 41/142 |
| 2020/0228565 | A1 * | 7/2020 | Reverte | H04L 63/1425 |
| 2020/0244639 | A1 * | 7/2020 | Arif Khan | G06N 20/10 |

(Continued)

*Primary Examiner* — Stephen T Gundry
(74) *Attorney, Agent, or Firm* — David H. Judson (57) ABSTRACT

This disclosure describes a bot detection system that leverages deep learning to facilitate bot detection and mitigation, and that works even when an attacker changes an attack script. The approach herein provides for a system that rapidly and automatically (without human intervention) retrains on new, updated or modified attack vectors.

9 Claims, 8 Drawing Sheets

(56) References Cited

U.S. PATENT DOCUMENTS

| | | | |
|---|---|---|---|
| 2020/0273040 A1* | 8/2020 | Novick | G06Q 20/4016 |
| 2020/0344259 A1* | 10/2020 | Kurupati | H04L 63/0876 |
| 2020/0364573 A1* | 11/2020 | Ramachandran | G06N 3/063 |
| 2020/0366671 A1* | 11/2020 | Larson | G06F 9/451 |
| 2020/0396233 A1* | 12/2020 | Luo | G06N 3/08 |
| 2020/0412767 A1* | 12/2020 | Crabtree | H04L 63/1441 |
| 2021/0110014 A1* | 4/2021 | Turgeman | G06F 11/3419 |
| 2021/0144517 A1* | 5/2021 | Guim Bernat | H04L 47/781 |

\* cited by examiner

AUTOMATED LEARNING AND DETECTION OF WEB BOT TRANSACTIONS USING DEEP LEARNING

BACKGROUND

Technical Field

This application relates generally to protecting websites and mobile applications (apps) from automated attacks by scripts or bots.

Brief Description of the Related Art

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

It is also known to provide technologies that detect malicious bot transactions on web and mobile applications. These technologies work by analyzing attributes received from client devices, e.g., with data being collected on the client using a JavaScript-based approach to fingerprint clients and collect telemetry to evaluate the user behavior and differentiate bots from humans. Typical attributes include client device network, hardware, browser and software properties. Additionally, these techniques may also analyze human interaction events (e.g., mouse, keystroke timings, accelerometer and gyroscope data, touch activity, etc.) to check for human versus bot activity.

Although the above-described bot detection and mitigation technologies provide significant advantages, bot script writers continuously adapt and improve their attack scripts as they attempt to avoid detection. One potential approach to this problem involves potentially applying deep learning technologies. Deep learning (also known as deep structured learning or hierarchical learning) is part of a broader family of machine learning methods based on artificial neural networks. Learning can be supervised, semi-supervised or unsupervised.

There are significant challenges, however, in applying typical deep learning in the bot detection space. In particular, typically deep learning assumes that classes (used for the learning process) are static. As an example, consider a neural network classifier that is built to distinguish images of, say, cats versus dogs. The trained model works well as long as the images used for training are representative of the universe of cats and dogs (and the labels applied during training are accurate). In a bot detection system, and in contrast, the goal is to try to build a classifier to distinguish a human being from a bot. Although a system can collect enough human samples for training, the same cannot be said for bot samples. This is because what constitutes a bot sample is not static. Thus, if an attacker creates a bot script on day one and a network is built to classify bots versus humans, the bot writer can simply change this script, in which case the previously-trained classifier no longer works. In other words, any training done on pre-collected human and bot data to create a neural network only results in a network that can detect that particular class of bots that the network was trained on.

Thus, there remains a need to provide enhanced bot detection techniques that can leverage deep learning but that overcome these limitations.

BRIEF SUMMARY

This disclosure describes a bot detection system that leverages deep learning to facilitate bot detection and mitigation, and that works even when an attacker changes an attack script. The approach herein provides for a system that rapidly and automatically (without human intervention) retrains on new, updated or modified attack vectors.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
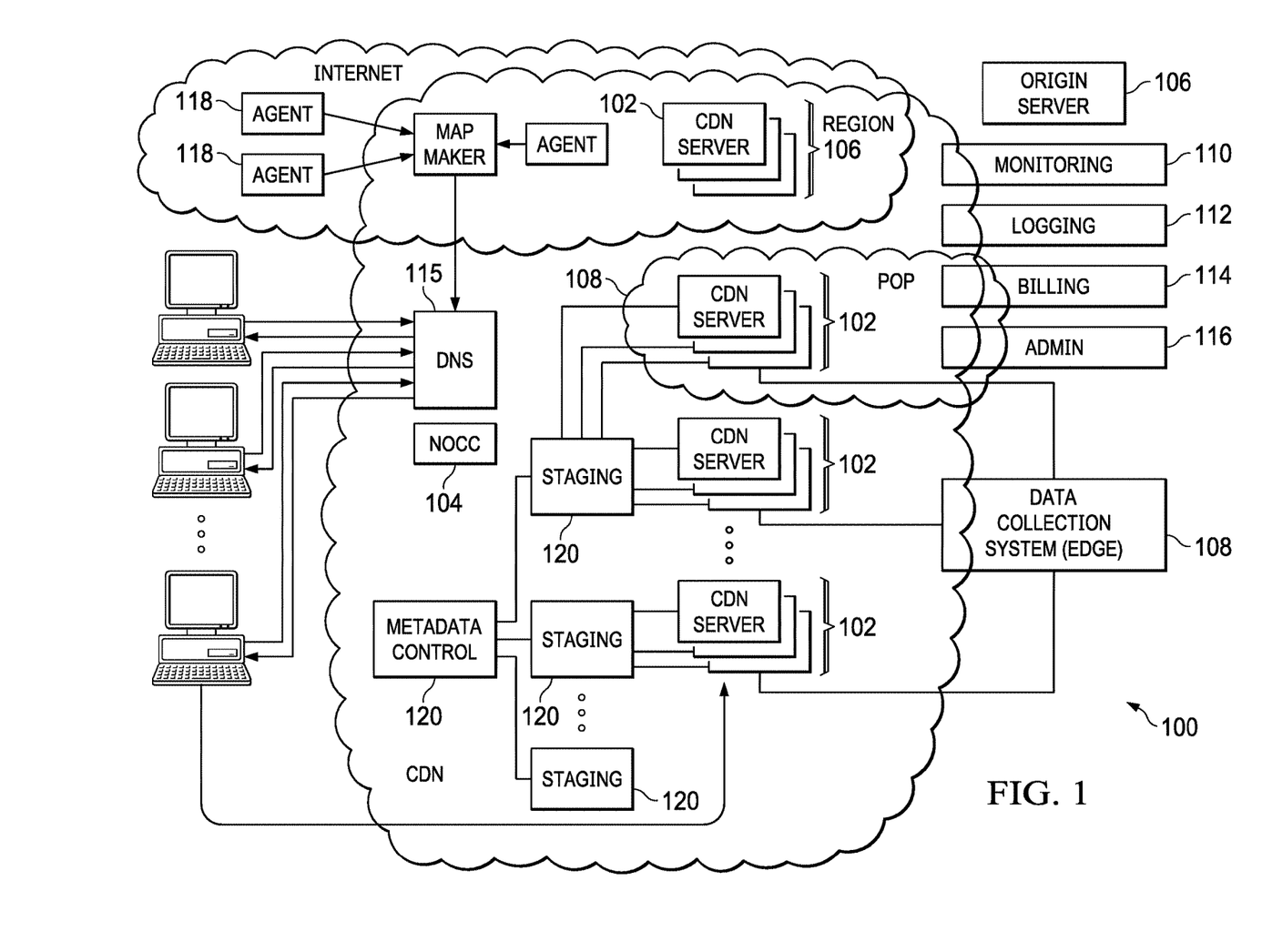
FIG. 1 is a block diagram illustrating a known distributed computer system configured as a content delivery network (CDN)

In a known system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
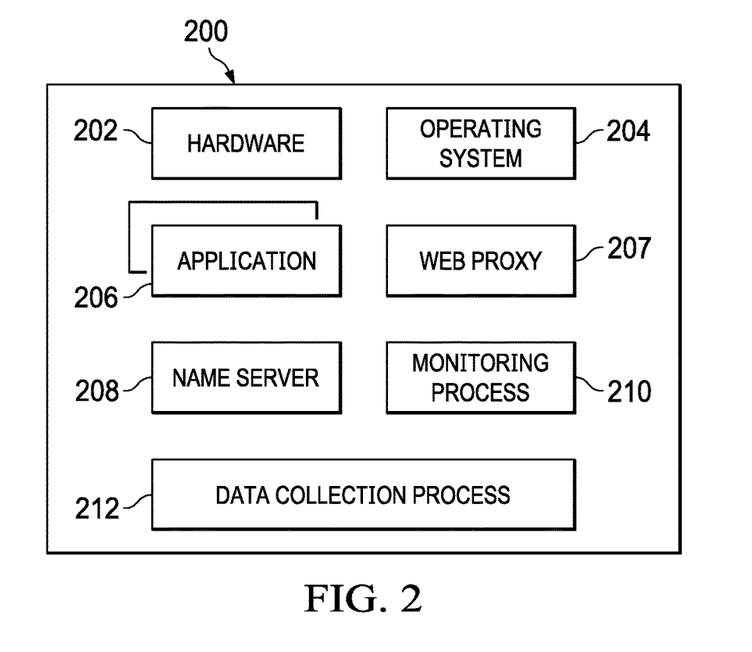
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

Thus, and as used herein, an "edge server" refers to a CDN (overlay network) edge machine. For a given customer, the CDN service provider may allow a TCP connection to originate from a client (e.g., an end user browser, or mobile app) and connect to an edge machine representing the customer on a virtual IP address (VIP) assigned to the customer, or a general VIP that allows for discovery of the intended customer. For purposes of this disclosure, it is assumed that this edge machine does not have the customer's private key or the customer's certificate.

Figure 3:
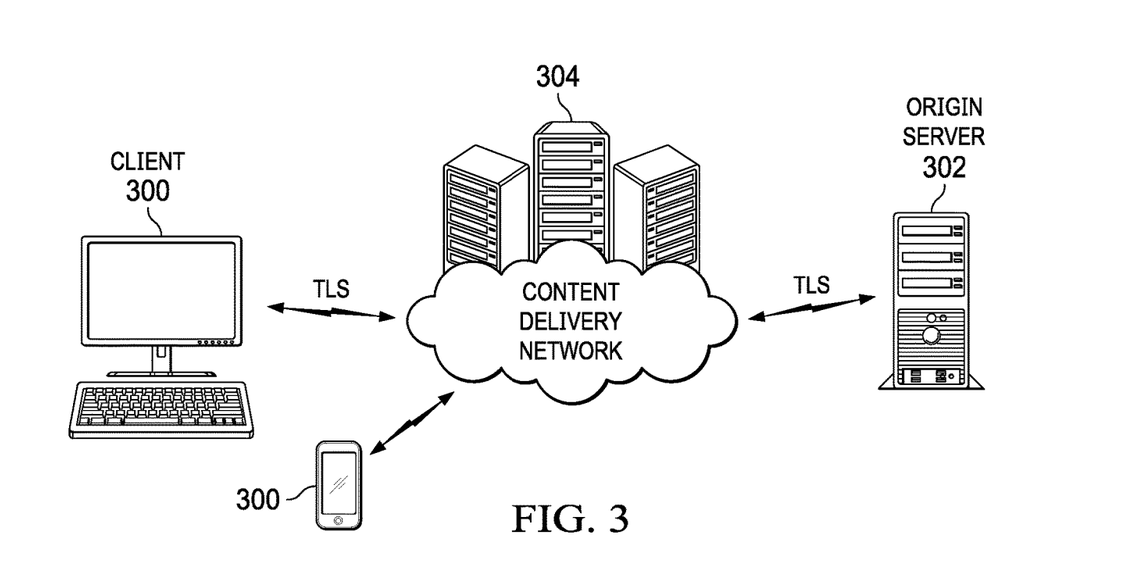
FIG. 3 is a representative active TLS session among a requesting end user client, an edge server, and an origin server.

As illustrated in FIG. 3, in the typical interaction scenario, an end user client browser or mobile app 300 is associated with a customer origin server (or "origin") 302 via the intermediary of an overlay network edge machine server instance 304 (sometimes referred to as an "edge server"). The terms "origin" or "edge" are not intended to be limiting.

As further background, HTTP requests are expected to come with certain headers, for example the Host header, which may indicate which web server is being addressed, or the User-agent, which identifies what type of system (browser, device) is making the request so that the web server hosting the content can response with content adapted to the system that requests it. Different browsers (Edge, Firefox, Safari, Chrome, Opera) send more or less the same set of headers, but the order in which headers are sent varies from one browser to the next or the HTTP protocol version. The header sent also depends on the method of the (POST vs. GET). and the type (XHR request vs. text/html requests). The order of the HTTP header and the protocol version constitutes a header fingerprint.

It is known how to perform client request anomaly detection by evaluating a request header signature and looking for anomalies typically seen with bots. If the total anomaly score reaches a predefined threshold, an action rule will trigger. Some of these rules are designed to evaluate the header order of requests coming from client claiming to be Firefox, Chrome, Opera, Safari, Internet Explorer or Microsoft Edge.

Basic bots and botnets can be detected relatively easily using such detection techniques. These more simplistic bots usually give themselves away because there are enough anomalies in the header signature, or their behavior is atypical of a regular user. That said, the system may produce false negatives with respect to highly distributed botnets that hide behind a proxy, send requests at a low rate, or perhaps have little to no anomalies in their header signatures. To detect these more sophisticated botnets, sometimes running on a headless browser (e.g., CasperJS, PhantomJS, Selenium, NodeJS), more advanced detection techniques may be used. JavaScript injection techniques are widely used in the industry to help detect these more advanced botnets. In particular, a bot that shows little anomalies in the header signature and behaves "like a regular user" may actually not fully support JavaScript. For a bot that fully supports JavaScript, it is desirable to inject code that helps collect specific characteristics (a fingerprint) of the client that when evaluated, helps detect them.

Bot detection using information collected through Javascript (JS) may proceed as follows. At step (1), the JS is dynamically injected at the edge on the relevant pages (text/html). At step (2), the client loads the JS, executes it, and sends the data collected asynchronously. At step (3), the edge server intercepts and evaluates the JS fingerprint, looking for specific anomalies typically seen when coming from an automated system (script or bot, etc.). At step (4), each anomaly is given a score and, if the fingerprint total anomaly score goes beyond a certain threshold, the client is classified as a bot. The result of the fingerprint evaluation is recorded in a session cookie and evaluated with each subsequent request.

Figure 4:
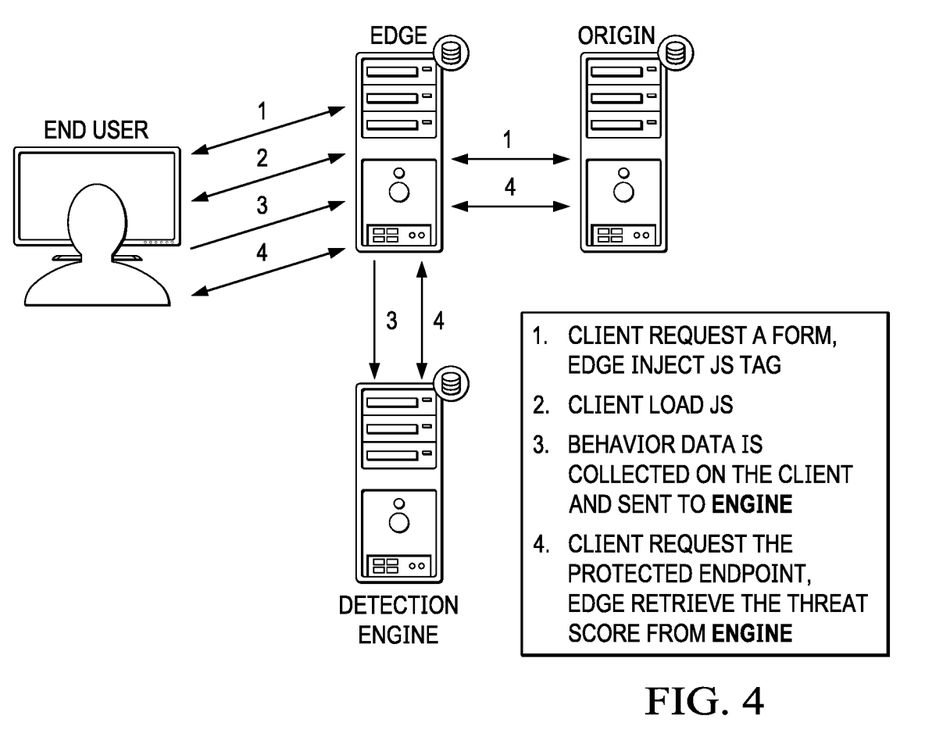
FIG. 4 is a technique by which a script-based technology is used to collect a fingerprint and other behavioral data from a requesting client.

Thus, and as depicted in FIG. 4, JavaScript-based technology collects a lightweight fingerprint and other behavioral data from the client. The data is collected asynchronously and sent to a bot detection engine. On a protected request (e.g. TLS-secured POST login), the edge server obtains the client classification from the bot detection engine and applies it on the edge.

Several methods may be used to detect bots using the fingerprint include, without limitation, anomaly detection, dynamic rate limiting, and blacklisting.

Anomaly detection is based on the principle that good browsers (such as Chrome, Firefox, Safari, and the like) have a few valid combinations of given fingerprints for each browser version. The "known" or "correct" combinations are learned a-priori. This can be done by analyzing prior human traffic and building a table of valid combinations (user agent and associated fingerprint possibilities). A bot script masquerading its user-agent as one of the well-known browsers is then caught by checking for the existence of the user-agent and the given fingerprint in the "known/correct" table.

Dynamic rate limiting is based on the principle that the system keeps tracks of the received fingerprints and then rate limits given fingerprints. Bot Attacks can be blocked in this way, as the given fingerprint will rapidly exceed the allowed rate threshold.

Blacklisting is based on the principle that the fingerprints of malicious bot tools can be collected and stored in a database/file (also known as a blacklist file). When a fingerprint is part of this blacklist file, it is then blocked.

The above techniques can be modulated with other signals to produce higher accuracy.

Summarizing, a browser validation process such as described above collects information from the client using JavaScript techniques to help identify the type of client machine the edge server is interacting with and the configuration of the browser. This technique is often times referred as "fingerprinting." The process does not collect any information that could identify the user of the machine. The data collected (also known as the fingerprint) preferably is sent to a data collection platform and kept for a given time period. Preferably, the fingerprint is used to enable the provider to research and define new heuristics that help the bot detection engine to detect more advanced bots. These heuristics are preferably instantiated as detection rules and become part of a fingerprint evaluation ruleset. Preferably, the fingerprint process is only executed once a session. As additional related fingerprint information is collected and analyzed, the fingerprint evaluation ruleset may evolve, allowing the system to detect more bots. Preferably, clients that are identified as bots are tracked through their session cookie. The session cookie is unique to a given web site and cannot be used to correlate the activity of a given bot on other web sites, although the system may provide for the ability to track the activity of a botnet across customers that use the bot detection service. Activity coming from these bots preferably is tracked and reported. Logs of this activity are then to generate bot activity and bot analysis reports that can be reviewed by a customer through a secure portal.

The following glossary defines various terms in a representative architecture as has been described so far:

fingerprint: data (a data set) collected by a JavaScript or SDK running on a client; the fingerprint typically comprises one or more characteristics of the machine and web browser, such as the screen size, browser version, font supported, browser plugins installed;

telemetry: data recording user behavior, such as (without limitation) mouse movement, gyroscope data, keystrokes, touch screen interaction;

sensor data: a collection of the fingerprint and the telemetry being sent by the client machine;

bot detection service: a computing infrastructure (machines, devices, appliances, software, database, data, etc.) that evaluates the sensor data;

bot detection service cluster a set of servers, e.g., running a bot detection engine. and that evaluate the sensor data for a given customer;

bot detection service API: an Application Programming Interface (API) that receives the sensor data and allows an edge server to retrieve a threat score; threat score: a client classification (bot or human) returned by the bot detection service based on the evaluation of the sensor data;

autopost: a JSON-formatted POST request that is generated by the bot detection service JavaScript on the client side and that carries the sensor data;

user behavior analysis: the process of collecting fingerprint and telemetry from the client to evaluate the behavior of the user to classify it as a human or bot;

credential abuse: a type of web attack that typically comprises replaying a known list of valid credentials (username+password) against various web sites in an attempt to take over the account;

gift card abuse: a type of web attack that consist in guessing the PIN code associated with a gift card through a brute force attack;

scraper reputation: the reputation of an IP address (IP) in a client reputation "scrapper" category;

base page: a main HTML page that hosts the code for the main structure, content of the page and that typically references additional objects such as JavaScript, style sheets, images; and protected resource/endpoint/API: a web resource/URL to be protected.

Automated Learning and Detecting Web Bot Transactions Using Deep Learning

With the above as background, the technique of this disclosure is now described.

Figure 5:
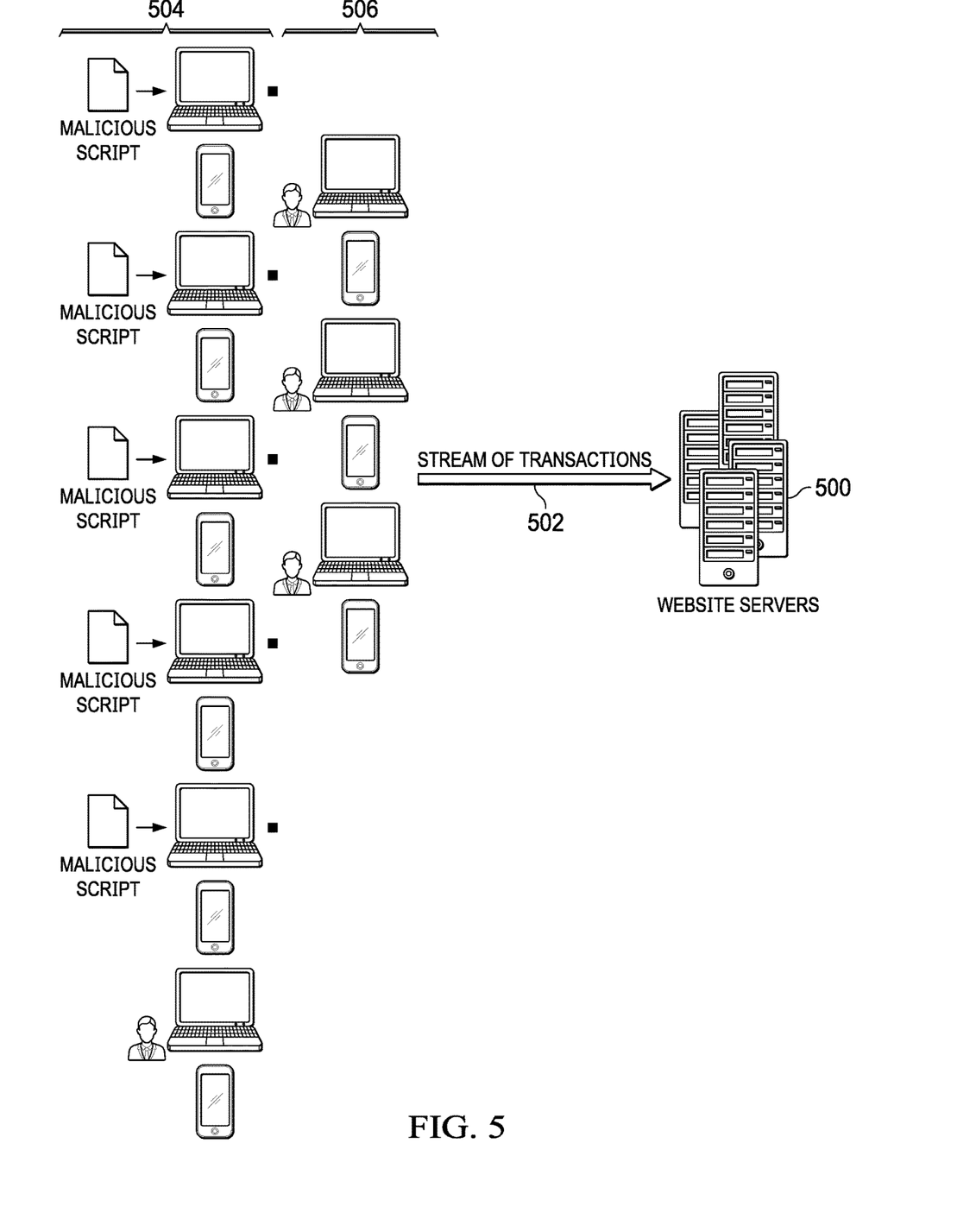
FIG. 5 depicts a website receiving both bot and human transactions.
Figure 6:
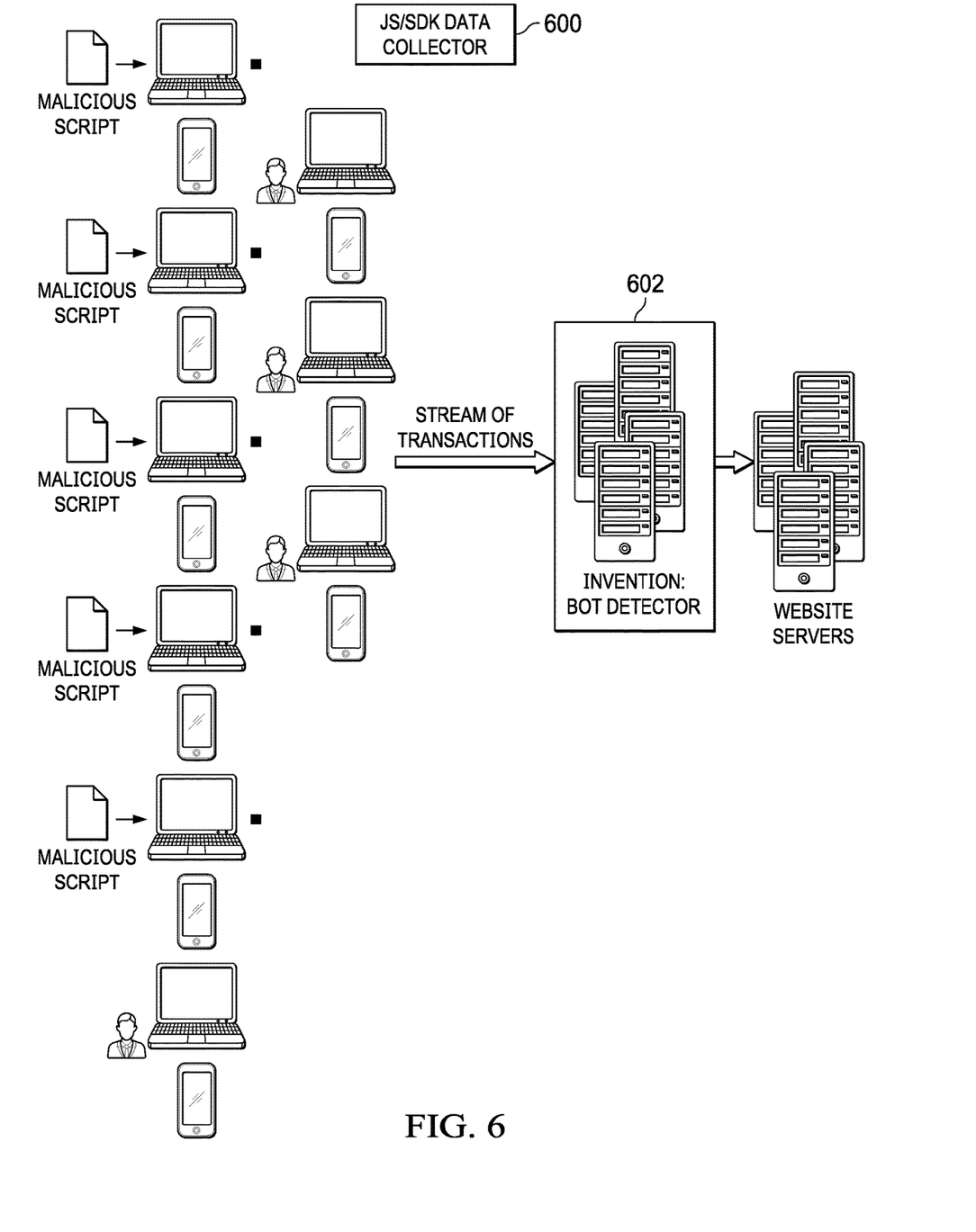
FIG. 6 depicts the basic architecture of this disclosure to provide automated learning and detection of web bot transactions using deep learning.

A representative operating environment is depicted in FIG. 5. In this environment, website 500 receives a stream of transaction 502 from both bots 504, as well as humans 506. The technique of this disclosure is aimed at detecting and blocking the bot transactions. To this end, and with reference to FIG. 6, according to this disclosure a client-side data collector component 600 is coupled to a server-side bot detector component 602. The client-side data collector component 600 preferably is implemented in the manner described above, namely, using a script-based approach that collects network data (e.g., such as TCP, HTTP, TLS, SSL information), browser information (e.g., such as browser user agent (UA), browser width, height, fonts, plug-ins used, etc.), and user interaction event (e.g., mouse activity, keystroke timing and activity, touch activity, etc.). For each human and bot transaction, the client-side data is sent along with the transaction. The bot detection service implements the bot detector, preferably as a deep learning cluster. As will be described, the bot detector component implements a technique to automatically train on new bot data and to distinguish it from human data. This technique works even as an attacker changes an attack script.

Figure 7:
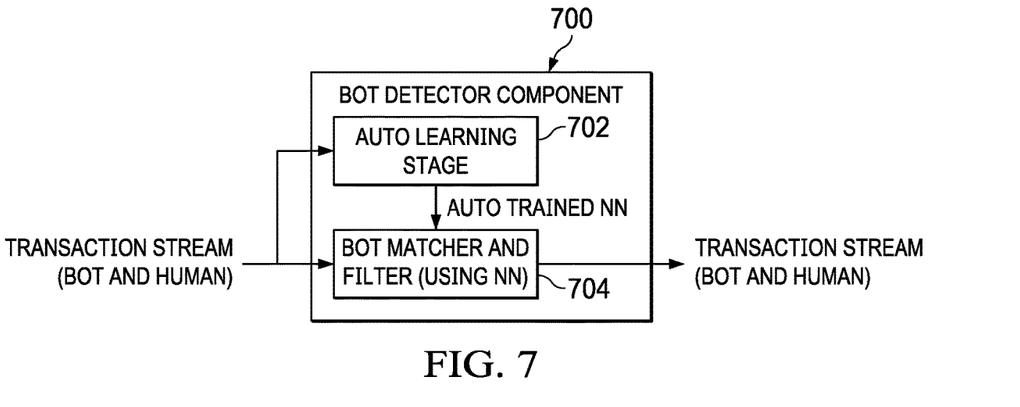
FIG. 7 depicts the deep learning technique of this disclosure.

To this end, and as depicted in FIG. 7, the bot detector 700 comprises an auto-learning stage 702, and a bot matcher/filter stage 704. The auto-learning stage 702 operates to detect an attack, and to automatically train a neural network that is then used to discriminate between the bot and human transactions in the incoming stream. The neural network is sent to the bot matcher/filter, which runs each transaction through the created neural network. Each of these stages is described in further detail below.

Figure 8:
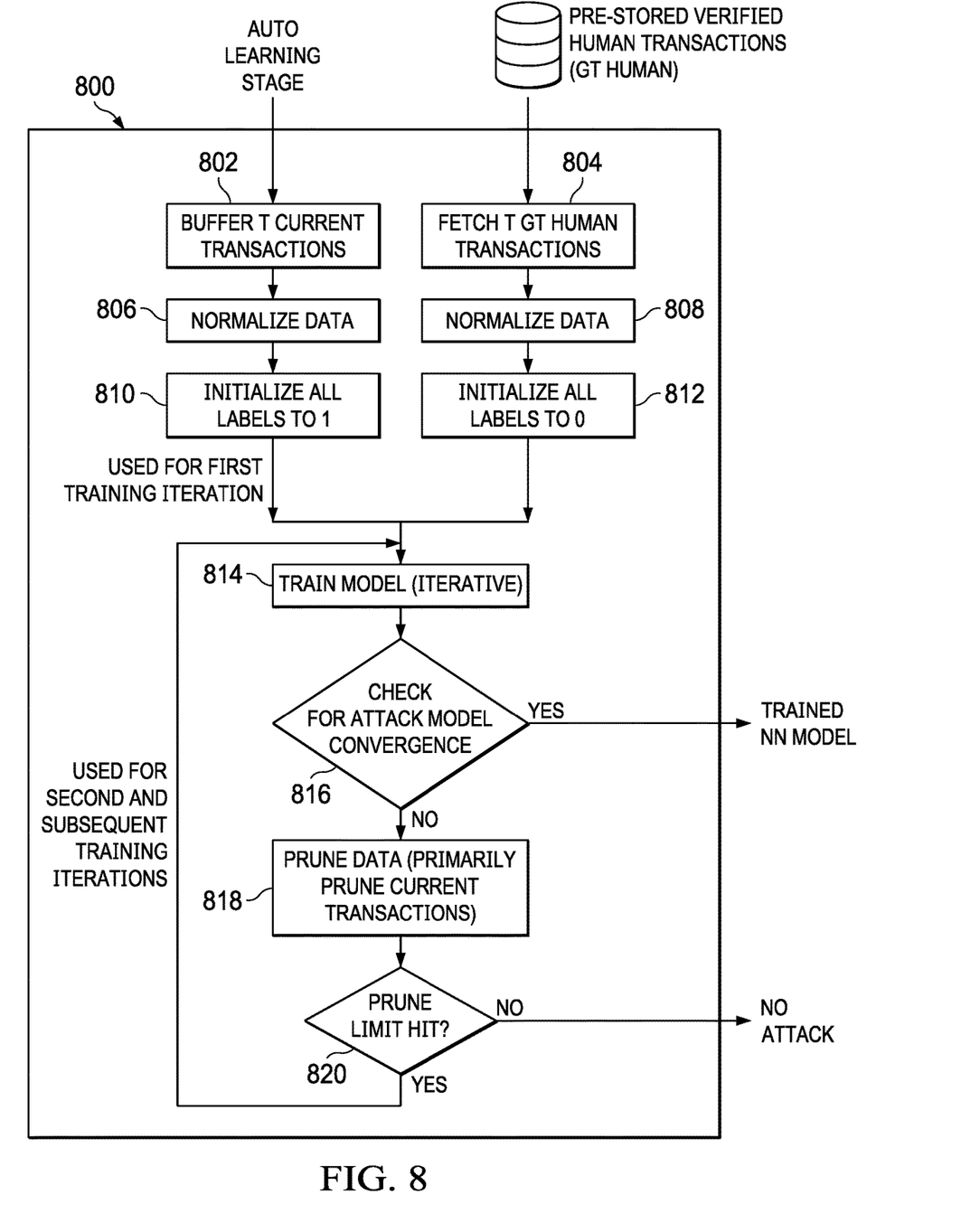
FIG. 8 depicts an automated learning stage that generates a neural network model.

FIG. 8 depicts the auto-learning stage 800 in a preferred embodiment.

In a preferred operation, at step 802 incoming transactions (which may include human and/or bot transactions) are first buffered. These are the transactions being received at the site. In this example, "T" such transactions are buffered, and where T may be any convenient value (e.g., 1000, 10,000, etc.) large enough to facilitate training of the neural network. As depicted, these transactions are referred to as "current transactions." In parallel, and at step 804, T number of pre-stored previously-verified human transactions are fetched, from a data store. In particular, these transactions are those that have been verified to be human, e.g., through an offline analysis. The particular manner in which these transactions have been verified as "human" is not necessarily a limitation of this disclosure. These transactions are referred to herein as "GT human transactions" where "GT" stands for ground truth. At step 806, the T current transactions are normalized and, at step 808, the GT human transactions are normalized. This normalization is carried out to facilitate the neural network training. In particular, preferably normalization takes the incoming data elements in each transaction and, as necessary, converts/scales them numerically into smaller ranges. For instance, in the case of the current transactions, if the data items include mouse movement coordinates (typically in the screen size range of 0-1920), normalization can be done by dividing each coordinate by 1920, which thereby converts the value into a floating point number. At step 810, the normalized T current transactions are labeled; at step 812, the normalized GT human transactions are labeled.

In one embodiment, and as will be seen, an end goal of the auto-learning is to create a neural network that returns a given score (e.g., 0) for a human transaction, and another given score (e.g., 1) for a bot transaction. It should be appreciated that these scores ("0" and "1") here are interchangeable with one another provided the workflow is otherwise consistent with the choice. Thus, and in the embodiment depicted, and for the transaction group "GT human transactions," at step 812 a label of "0" (equivalent to a determination of a "human") is given to all these transactions. Because these transactions are manually pre-verified to be human (as previously noted), in effect this then is the correct label for all these transactions. On the other hand, and for the transaction group "current transactions," at step 810 a label of "1" (bot) is given to all the transactions in this group. As can be appreciated, this (the label=1) is an artificial label in that at least some (if not even all) of the transactions in the group are likely to have originated from humans. At this point, however, the system does not know which of the current transactions in fact are human and which are bot, but nonetheless this artificial label is applied at step 810.

Steps 802 and 804, steps 806 and 808, and steps 810 and 812 may be carried out concurrently, or asynchronously.

The next step 814 is to train a neural network with the provided data and labels from the above-described operations. Preferably, and as will be described, this training is done through a set of training iterations, in association with a data pruning operation. A commercial or otherwise available neural network training method may be used for a particular iteration. The particular network size, the number of layers, the number of activation functions, etc. preferably are selected depending on a number of elements/features present in the transactional data, as well as other system considerations (such as training time, computational efficiencies, etc.). For training purposes, preferably a suitable cost/loss function (e.g., binary cross entropy, mean squared error, or the like) is implemented during the neural network training. Preferably, the training process attempts to minimize loss/error for each training sample. At the end of the training iteration, true bot samples in the "current transactions" group bucket tend towards having low loss/cost, as the data can be discriminated from samples in the "GT human transaction" bucket. In contrast, human samples in the current transactions group bucket tend towards having higher loss/cost, as the data cannot be discriminated from samples in the "GT human transaction" bucket. Indeed, samples in the GT human transactions bucket will tend to have a higher cost if there are a significant number of human samples in the current transactions group bucket.

If the bot attack were crafted in such a way that true bot samples are modeled along a variant group (e.g., "a few human samples"), they will still tend to have low loss/cost, because in GT group traffic the "few human samples" likewise will be a small percentage whereas in the current transactions traffic the percentage will be much higher.

After the training iteration, and at step 816, the system checks for attack model convergence, meaning that, during the supervised training, the set of weights in the model have begun to find (converge on) the values needed to produce the correct (trained) response. Preferably, this is done by checking the training scores and loss for all the transactions. In one non-limiting embodiment, if a training score is greater than a given value (e.g., >0.5) for a transaction, this indicates a bot; if a training score is less than the given value (e.g., <0.5), however, this indicates that the transaction involves a human. Other thresholds may also be implemented without departing from the technique herein. For model convergence, preferably the system tests whether a given large majority (e.g., defined by a configurable percentage threshold such as 99%, or some suitable high threshold) of transactions in the current transaction bucket are scored as bots; similarly, the system tests for model convergence for the GT human transactions, namely, if the large majority of "GT human transactions" are scored as humans. For a first iteration of the model, in the event the traffic is determined to comprise a mix of human and bot traffic, the loss functions (e.g., for human samples in the current transactions bucket) will tend to be higher, with scores that diverge from the desired outcome. In this example, the model has not converged. On the other hand, if the traffic in the current transactions group is purely bot, then in this scenario the neural network model will have converged.

If the model did not converge, however, the routine continues at step 818 to a pruning step. In particular, preferably the pruning step involves removing samples that fit a criterion, namely, human samples in the current transactions bucket that have a higher loss/cost (which, as noted, means that the data cannot be discriminated from the GT human transactions bucket). During the pruning step, samples whose loss/error is above a threshold are then removed from the current transaction bucket. By removing such samples, the system effectively filters out human samples from the current transaction bucket. In a variant embodiment, and in lieu of pruning based on loss/error, this step may evaluate transactions scores, as lower scores are indicative of human samples (and thus those samples can be removed). As a further option, and in cases where the attacker models the attack such that true bot samples in the "current transactions" group tend towards having low loss/cost, the operation at step 818 may prune a few of the GT samples with very high scores. This is an optional step and can help in model convergence.

Once data has been pruned, the auto-learning routine continues at step 820 to test whether there are enough samples left in the current transaction bucket. If pruning results in a majority of samples being removed, this is indicative of a lack of bot samples (lack of a bot attack) in the current transaction bucket; in this case, the routine simply exits out preferably with a "no attack" flag. If after pruning, however, the number of samples in the current transaction bucket is above a threshold, the system returns to step 814 to iterate to a next training step. If the flow returns to step 814, the auto-learning routine repeats the training process. In a next iteration, and in this example scenario, because some human samples have been removed from the current transaction bucket, typically the training process will have a much higher chance at hitting the convergence goals as previously described. The process is then repeated until model convergence is obtained (and the routine exits out with a trained NN), or too many samples have been pruned out (and the routine exit outs with a "no attack" flag). This completes the processing.

Figure 9:
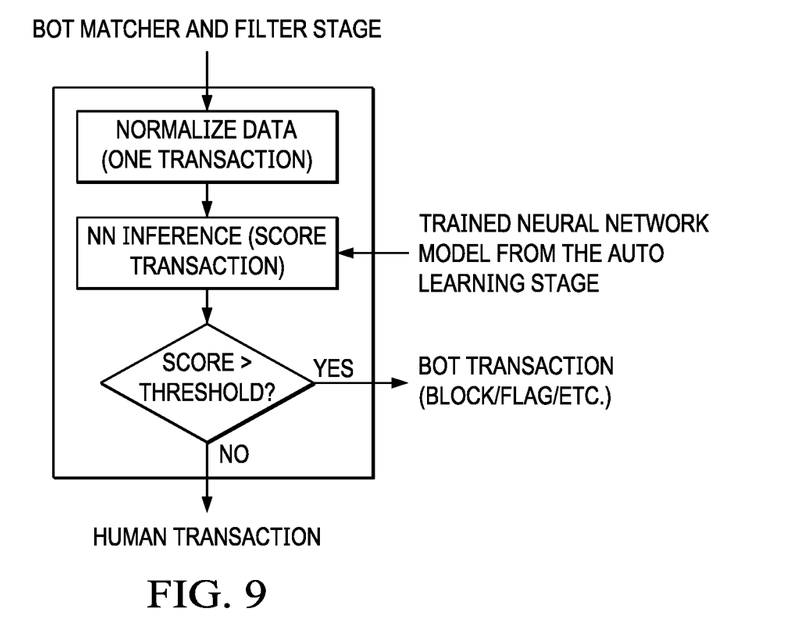
FIG. 9 depicts a bot matching/filter stage that uses the neural network model to discriminate bot/human traffic.

FIG. 9 depicts the bot matcher/filter stage. Preferably, this stage processes received transactions, normalizes data in each transaction and performs inference (scoring) on each transaction using the neural network trained from the auto-learning stage (FIG. 8). Transactions which have a score higher than some given threshold (e.g., 0.5, or some other suitable threshold) are marked as bots. When the auto learning stage detects a "no attack" flag, the process depicted in FIG. 9 is skipped.

Data collection techniques (for supporting neural network model building) include, without limitation, active and passive data collection, data traffic monitoring, packet inspection, application layer-based, operating system kernel-based, and otherwise.

Neural networks here may perform in-band learning, or out-of-band learning. In one non-limiting embodiment, Keras (a high-level API) is used to build and train the model in TensorFlow. For faster runtime, preferably the network is relatively small in size. A representative network, e.g., may comprise four (4) layers, with 40 neurons for the first layer, 10 neurons for the second layer, 5 neurons for the third layer, and one (1) output neuron. An activation function for the initial layers is ReLU (Rectified Linear Unit); the output layer may use this function as well. In one implementation (for web traffic), the input is mouse data, e.g., a given number of mouse events each defined by an X-coordinate, a Y-coordinate, and a timestamp. Thus, e.g., if there are 10 mouse events, 30 input signals are used for the model, preferably with each one normalized as previously described. For mobile traffic, the input may be device motion, e.g., acceleration in x, acceleration in y, acceleration in z, together with rotational alpha acceleration. Of course, the above examples are merely representative data sets and model structure.

The system typically includes a bot mitigation sub-system that is configured to take a given action once an attack has been identified. The nature and scope of the given action may be varied and preferably is configurable, e.g., by a security policy. In one embodiment, the given action is implemented in an automated manner using tooling that is triggered by a determination that the website being monitored is undergoing a bot attack. In this example, the mitigation sub-system may operate to divert/filter the attack traffic, trigger an alarm or other notification, provide rate or other controls to attempt to remediate the situation, or the like.

Other Enabling Technologies

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 1-2, although other implementations may be utilized as well. One or more functions of the computing platform may be implemented conveniently in a cloud-based architecture. As is well-known, cloud computing is a model of service delivery for enabling on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct.

Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Each above-described process, module or sub-module preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

There is no limitation on the type of computing entity that may implement the client-side or server-side of the connection. Any computing entity (system, machine, device, program, process, utility, or the like) may act as the client or the server.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

In one embodiment, the bot detection techniques herein are implemented "as-a-service" by a service provider, e.g., a content delivery network (CDN) service provider that operates a CDN as an overlay network (a shared computing infrastructure) on behalf of participating content provider customers. A particular CDN customer operates a website or web application that the content provider desires to protect against attack. Typically, the neural network model is built on a per-site basis, although this is not a limitation.

What is claimed is as follows:

1. A distributed computing system, comprising:
  a first computing machine comprising a hardware processor and associated computer memory, the computer memory holding a software process executed by the hardware processor and configured to train a neural network model using a first set of data representing current transactions all artificially labeled as bot traffic, and a second set of data labeled as human traffic, the second set of data having been previously determined to be representative of actual human transactions, wherein the first set of data is a mix of human and bot transactions; and
  a second computing machine comprising a second hardware processor and a second computer memory, the second computer memory holding a software process executed by the second hardware processor and configured to use the trained neural network model to discriminate traffic as being either bot traffic or human traffic;
  wherein the trained neural network model is updated as additional data comprising the first set of data is received.

2. The distributed computing system as described in claim 1 wherein the neural network model is built at least in part by pruning one or more transactions from the first set of data that, based on a given threshold, cannot be discriminated from transactions in the second set of data.

3. The distributed computing system as described in claim 1 further including a third computing machine comprising a third hardware processor and a third computer memory, the third computer memory holding a software process executed by the third hardware processor and configured to take a given mitigation action upon a determination that the traffic is a bot attack.

4. The distributed computing system as described in claim 1 wherein the neural network model is configured as a set of layers, the set of layers comprising an input layer, one or more intermediate layers, and an output layer.

5. The distributed computing system as described in claim 4 wherein the input layer comprises an activation function.

6. The distributed computing system as described in claim 1 wherein the first set of data or the second set of data having been generated from capture of end user mouse events.

7. The distributed computing system as described in claim 1 wherein the first set of data or the second set of data having been generated from capture of end user device motion.

8. The distributed computing system as described in claim 1 wherein the software process executed by the hardware processor in the first computing machine applies a cost/loss function during training of the neural network model.

9. The distributed computing system as described in claim 1 wherein the second computing machine is an edge machine of an overlay network.

* * * * *